(12) United States Patent
Fischer

(10) Patent No.: US 6,246,496 B1
(45) Date of Patent: Jun. 12, 2001

(54) PHOTOREFRACTIVE DEVICE FOR CONTROLLING INFORMATION FLOW

(75) Inventor: George L. Fischer, Hackettstown, NJ (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/100,780

(22) Filed: Jun. 15, 1998

(51) Int. Cl.[7] .................................. G02F 1/00; G03H 1/10
(52) U.S. Cl. ................................................. 359/109; 359/10
(58) Field of Search ................................... 359/108, 193, 359/107, 127, 109, 639, 583

(56) References Cited

U.S. PATENT DOCUMENTS

| | | |
|---|---|---|
| 4,508,431 * | 4/1985 | Henshaw ............................... 359/299 |
| 4,585,301 | 4/1986 | Bialkowski ........................... 350/96.2 |
| 4,767,197 * | 8/1988 | Yeh ........................................ 359/244 |
| 4,892,370 | 1/1990 | Lee ........................................ 350/3.74 |
| 4,971,409 | 11/1990 | Yeh et al. ............................. 350/9.64 |
| 5,005,954 * | 4/1991 | Liu ........................................ 359/107 |
| 5,285,308 | 2/1994 | Jenkins et al. ....................... 359/260 |

* cited by examiner

Primary Examiner—Leslie Pascal
Assistant Examiner—Christina Y Leung
(74) Attorney, Agent, or Firm—William G. Auton

(57) ABSTRACT

Three separate input beams of light can be combined in a photorefractive material and outputs one signal. Each of the three input beams can carry information, for example, by passing each input beam through a glass slide with opaque lettering. The message may be segmented and a portion of it placed in each input beam for security reasons. Only the output beam contains the full message. Further, the invention can be used as an all-optical three-input AND gate. A signal is only produced when all three beams of light are present.

1 Claim, 2 Drawing Sheets

PHOTOREFRACTIVE DEVICE FOR CONTROLLING INFORMATION FLOW

CROSS-REFERENCES TO RELATED PATENT APPLICATIONS

None

STATEMENT REGARDING FEDERALLY SPONSORED RESEARCH OR DEVELOPMENT

The invention described herein may be manufactured and used by or for the Government for governmental purposes without the payment of any royalty thereon.

BACKGROUND OF THE INVENTION

This invention relates to the use of nonlinear optical photorefractive materials to combine information, and further relates to the control of the flow of information.

When two coherent beams of light intersect, their wave nature results in an interference pattern or gating pattern. By placing a photorefractive crystal at the location of intersection, this interference pattern can be made to form within the crystal. The interference pattern is made up of a stationary pattern of alternating bright and dark fringes of light. If the two beams have the same intensity and if they are mutually coherent, there will be no light in the dark fringes. Using light of a suitable wavelength for the given photorefractive material results in the excitation of charge carriers within the bright fringes. These charge carriers are mobile, and they diffuse in all directions. They can be captured by charge acceptors in the regions both bright and dark fringes, but when they are captured in the regions of dark areas, there is a very small probability of re-excitation. For this reason an alternating fringe pattern of plus and minus charge forms. The index of refraction of the crystal is related to its electronic properties, and this charge grating produces an index of refraction grating. The two beams of light effect a variation in the index of refraction of the material, hence the name "photorefractive." A third beam of light can be efficiently diffracted from the grating if it is incident on the grating at the Bragg angle. The Bragg angle is the angle at which the weak reflections from each small refractive index variation add together coherently, resulting in a large diffracted signal.

Some of the literature relating to photorefractive materials and their applications are, for example, *Topics in Applied Physics Photorefractive Materials and Their Applications I Fundamental Phenomena*, P. Günter and J. P. Huignard, Eds., Springer-Veriag, Berlin, 1988. and *Topics in Applied Physics Photorefractive Materials and Their Applications II Survey of Applications*, P. Günter and J. P. Huignard, Eds., Springer-Verlag, Berlin, 1988. and the references therein. Photorefractive materials have already been used to combine (and subtract) information from two beams. They have also been used to Bragg-diffract a third beam off of a grating formed by two other mutually coherent beams of light.

Thus, there exists a need for a device which combines several input beams with information therein to produce a selective output beam.

BRIEF SUMMARY OF THE INVENTION

Three separate input beams of light can be combined in a photorefractive material and outputs one signal. Each of the three input beams can carry information, for example, by passing each input beam through a glass slide with opaque lettering, other means of putting information on a light beam are to be considered. The message may be segmented and a portion of it placed in each input beam for security reasons. Only the output beam contains the full message. Further, the invention can be used as an all-optical three-input AND gate. A signal is only produced when all three beams of light are present.

Therefore, one object of the present invention is to provide a means for controlling the flow of information through light beams.

Another object of the present invention is to provide a means for controlling the flow of information through light beams with a security encoding feature therein.

Another object of the present invention is to provide a means for controlling the flow of information through photorefractive means.

Another object of the present invention is to provide a means for optical computing such as an AND gate.

These and many other objects and advantages of the present invention will be ready apparent to one skilled in the pertinent art from the following detailed description of a preferred embodiment of the invention and the related drawings.

DETAILED DESCRIPTION OF THE INVENTION

Figure 1:
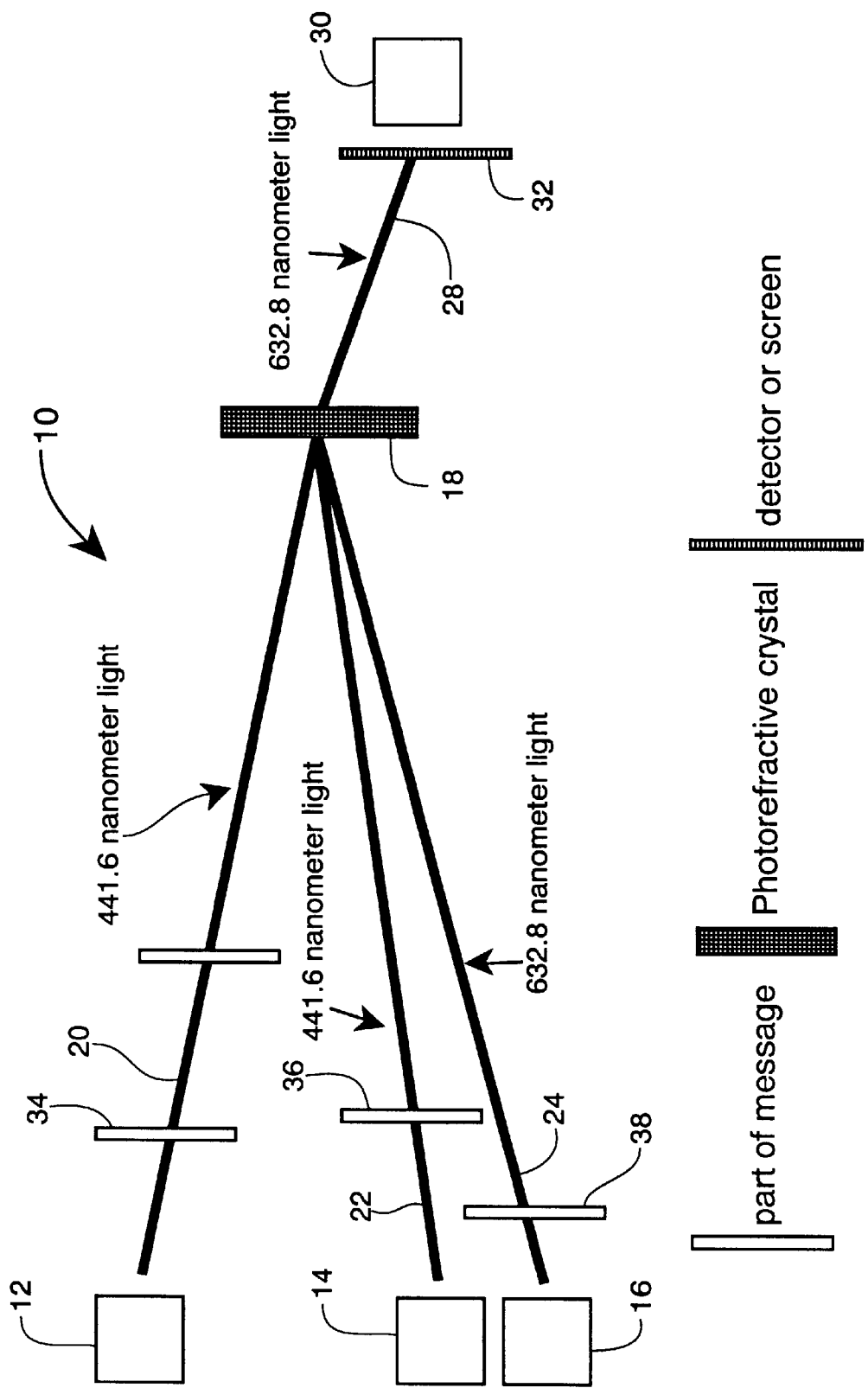
FIG. 1 illustrates by schematic a means for combining information.

Referring to FIG. 1, a partial schematic of the present invention is shown. A photorefractive device 10 is shown having a first and second source, 12 and 14, respectively, of laser radiation of the same wavelength, and a third source 16 of laser radiation of a different wavelength. At least two sources of the same wavelength of radiation are required. A photorefractive material 18 receives the three beams 20, 22, and 24 of radiation from the sources 12, 14 and 16, respectively. Under the proper control, the photorefractive material 26 outputs a beam 28 to a sensor 30. Sensor 30 may include a screen 32 upon which the information may be displayed. Information is imparted onto the three beams 20, 22, and 24 by means 34, 36 and 38.

In particular, two one-centimeter-diameter collimated laser beams 20 and 22 of the same wavelength (441.6 nm) are made to intersect in a photorefractive crystal 18. A third one-centimeter-diameter collimated laser beam 24, that could be of a different wavelength (632.8 nm), impinges on the crystal 18 at the Bragg angle, and is efficiently diffracted off of the index of refraction grating within the crystal if both beams 20 and 22 are present. The diffracted signal projects onto a ground glass screen 32. A message or other information can be divided into several parts and in the present invention each part is silk screened onto a microscope slide. The microscope slides are placed in the beam paths. The opaque words partially block the beams. Only in those regions where all three beams are unblocked can a signal be diffracted. (It takes both 441.6 nm beams to make an interference pattern, where one beam is blocked the second 441.6 nm beam will uniformly illuminate that portion of the crystal, resulting in a region of uniform index of refraction, hence no diffraction in that region. Where the 632.8 nm beam is blocked there is no beam to be diffracted off the grating, so again no output beam in that region.).

Figure 2:
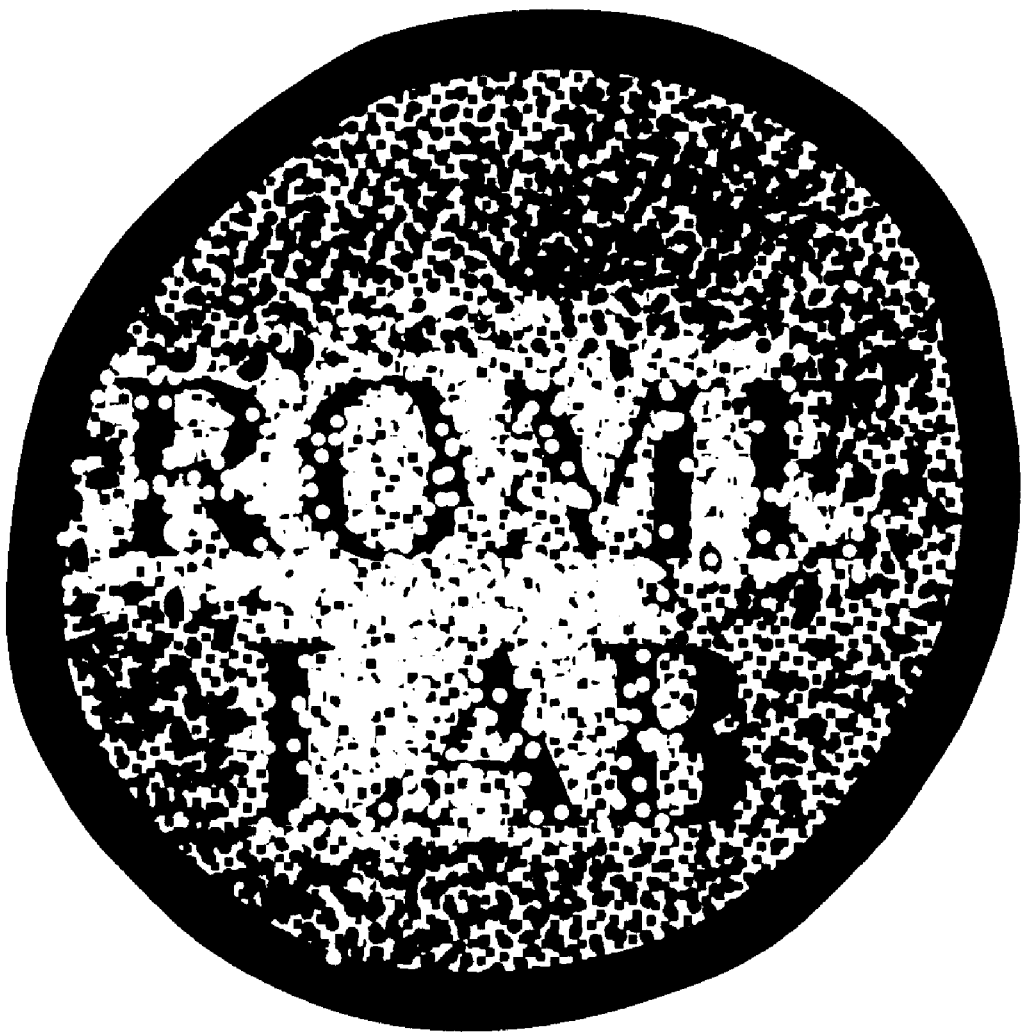
FIG. 2 illustrates a diffracted message produced by the present invention.

In FIG. 2 a typical diffracted image is depicted. As indicated in FIG. 1, the portions of the message can be placed anywhere along any of the three input beams as long as the transverse alignment is satisfied. Multiple portions of each message can also be placed on a single input beam. A new message can be combined within milliseconds after its constituent parts are placed in the input beam paths.

A photorefractive material is purchased or grown, a laser beam is passed through a beam splitter, not shown, and the two beams are made to intersect at the crystal. A third laser beam impinges on the crystal at the Bragg angle of the grating. An efficient diffracted output signal is produced. The parts of a message are added to the three input beams. The diffracted signal now contains the entire message.

The present invention uses three beams of light, which gives an additional degree of freedom for message encoding. For example the four time-evolving signals that can be correlated as described in the recent paper of J. R. Goff, ("Experimental relation of a multiproduct photorefractive correlation system for temporal signals," Vol. 36, Applied Optics Sep. 10, 1997, p. 6627.) could be increased to six signals with this invention.

This invention may be used as an all-optical three-input AND gate. An output signal is only produced when all three input beams of light are present in the crystal. In this mode of operation beams would be either entirely blocked or entirely unblocked.

Clearly many modifications and variations of the present invention are possible in light of the above teachings and it is therefore understood, that within the inventive scope of the inventive concept, that the invention may be practiced otherwise than specifically claimed.

What is claimed is:

1. A device for optically controlling the flow of information, said device comprising:

at least one first laser source outputting a first beam of a given wavelength, said first beam being split into at least two beams;

at least one second laser source outputting a second beam of a different wavelength;

means for inserting information into said at least two beams and said second beam;

means made of nonlinear photorefractive material for receiving said at least two beams and said second beam; said photorefractive means only outputting a third beam when said at least two beams of the same wavelength are present and said second beam is present therein; and means for receiving said third beam, wherein the information to be transmitted to said means for receiving is divided among the beams input into said photorefractive means, said information being inserted into each beam is only a part of the total information that may be received by the means for receiving.

\* \* \* \* \*